Sept. 25, 1945.  J. C. CURTIS  2,385,349
CHUCK MECHANISM
Filed Feb. 2, 1944  2 Sheets-Sheet 1
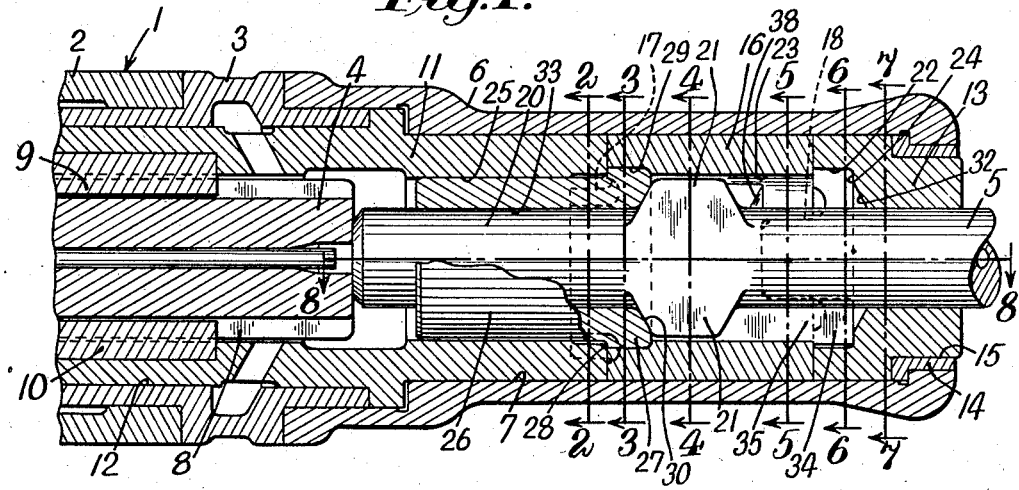
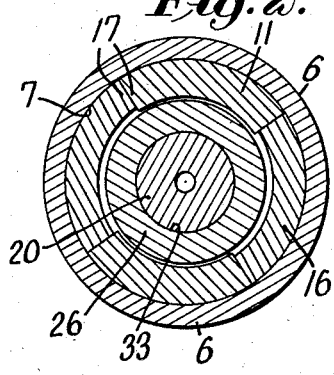 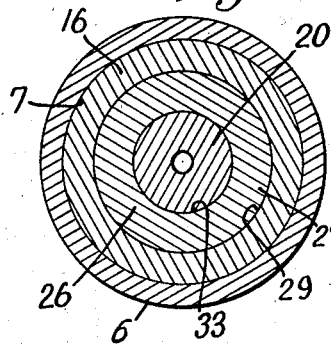 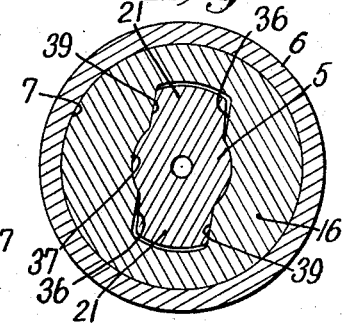
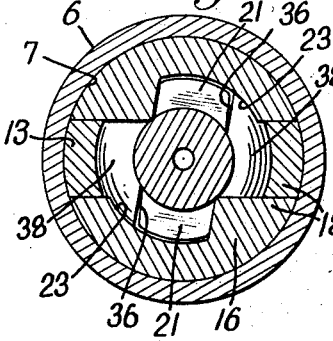 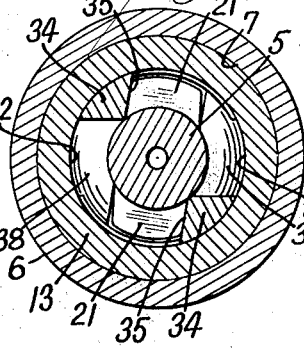 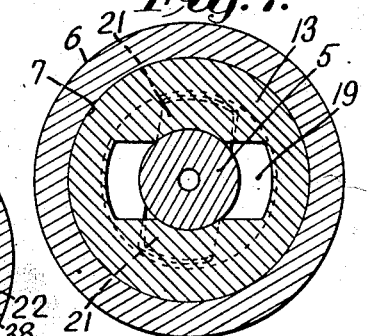
Inventor:
John C. Curtis.
by
Louis A. Maxson.
Att'y.

Sept. 25, 1945.   J. C. CURTIS   2,385,349
CHUCK MECHANISM
Filed Feb. 2, 1944   2 Sheets-Sheet 2
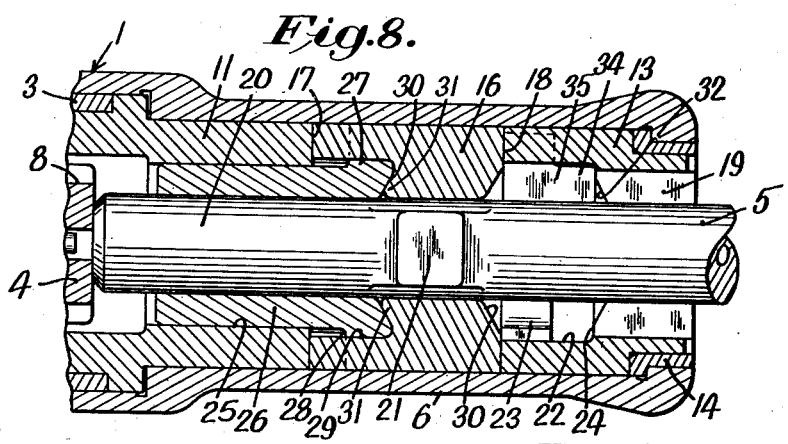
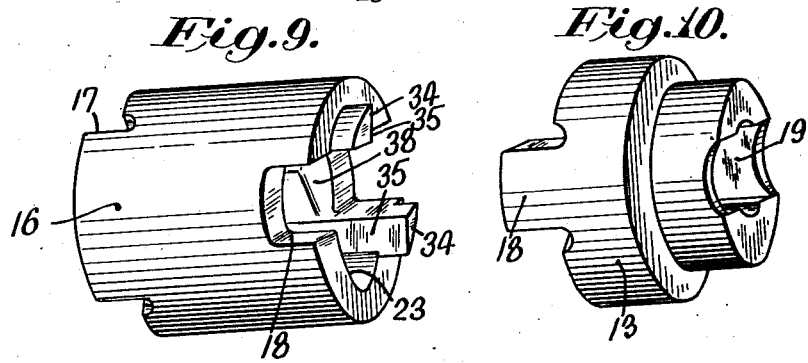
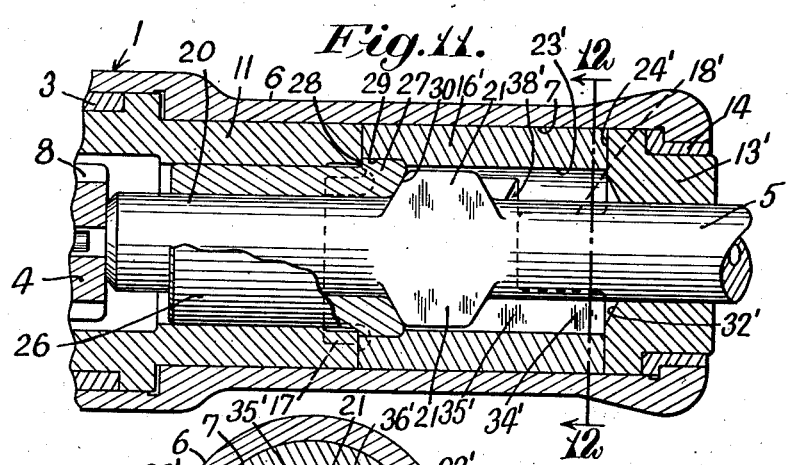
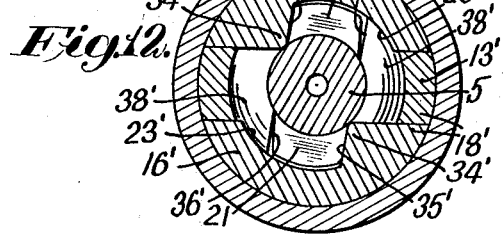
Inventor:
John C. Curtis.
by
Louis A. Maxson.
Atty.

Patented Sept. 25, 1945

2,385,349

UNITED STATES PATENT OFFICE 2,385,349

CHUCK MECHANISM

John C. Curtis, Claremont, N. H., assignor to Sullivan Machinery Company, a corporation of Massachusetts Application February 2, 1944, Serial No. 520,764

8 Claims. (Cl. 279—19.3)

This invention relates to chuck mechanisms and more particularly to an improved drill steel chuck mechanism for a hammer rock drill.

An object of the present invention is to provide an improved drill steel chuck mechanism. Another object is to provide an improved chuck mechanism having improved locking and driving means for a lugged drill steel. A further object is to provide an improved drill steel chuck mechanism having improved means for locking a lugged drill steel within the chuck mechanism and improved means for supporting and driving the drill steel. A still further object is to provide an improved driver and retaining ring arrangement for a drill steel chuck mechanism. Yet another object is to provide an improved drill steel chuck mechanism including a rotatable chuck sleeve, steel driver and steel retaining member wherein the driver is arranged between the chuck sleeve and the retaining member and is detachably coupled to each of the same. A still further object is to provide an improved drill steel chuck mechanism including a steel driver member and steel retaining ring associated in a novel manner whereby the steel lugs may be received in a chamber provided in the driver member and retaining ring and with a portion of the chamber in the retaining ring being of circular shape in cross section, and the driver member having forward steel engaging portions projecting into the circular chamber of the ring. Still another object is to provide an improved steel driver member having projections for limiting rotation of the steel lugs in the chuck mechanism and for positioning the steel lugs with respect to the longitudinal recesses in the driver member. Yet another object is to provide an improved steel driver member having longitudinal recesses for receiving the steel lugs and for preventing substantial rotation of the steel in either direction with respect to the chuck mechanism. A further object is to provide an improved replaceable chuck bushing for a drill steel chuck mechanism. These and other objects and advantages of the invention will, however, hereinafter more fully appear.

The present invention is an improvement over my Patents No. 2,337,031 and No. 2,337,312, granted on December 21, 1943.

In the accompanying drawings there are shown for purposes of illustration two forms which the invention may assume in practice.

In these drawings:

Fig. 1 is a view in central longitudinal section through a forward portion of a hammer rock drill, and illustrating a preferred form of the improved chuck mechanism.

Fig. 2 is a cross sectional view taken substantially on line 2—2 of Fig. 1.

Fig. 3 is a cross sectional view taken substantially on line 3—3 of Fig. 1.

Fig. 4 is a cross sectional view taken substantially on line 4—4 of Fig. 1.

Fig. 5 is a cross sectional view taken substantially on line 5—5 of Fig. 1.

Fig. 6 is a cross sectional view taken substantially on line 6—6 of Fig. 1.

Fig. 7 is a cross sectional view taken substantially on line 7—7 of Fig. 1.

Fig. 8 is a central longitudinal section taken substantially on line 8—8 of Fig. 1.

Fig. 9 is a perspective view of the driver member.

Fig. 10 is a perspective view of the retaining ring.

Fig. 11 is a sectional view taken on the plane of Fig. 1, illustrating a modified form of the chuck mechanism.

Fig. 12 is a cross sectional view taken substantially on line 12—12 of Fig. 11.

In both illustrative embodiments of the invention, the improved chuck mechanism is shown associated with a hammer rock drill, generally designated 1. The rock drill includes a motor cylinder 2 having a front cylinder head 3 secured to its forward end and containing a reciprocatory hammer piston having a striking bar 4 for delivering blows to the shank of a conventional lugged drill steel 5. Secured to the front cylinder head is a chuck housing 6 having a bore 7. As is usual in rock drills, the hammer piston is rotated as it is reciprocated and the rotative piston movements are transmitted to the drill steel so that as the latter is percussively actuated, it is intermittently rotated. The piston striking bar 4 has longitudinal grooves 8 which are slidingly interlocked with straight lugs 9 formed internally within a sleevelike chuck nut 10 suitably secured within a chuck sleeve 11. The chuck sleeve is rotatably mounted within a bore 12 in the front cylinder head 3 and within the chuck housing bore 7 in the manner shown. The drill steel 5 is operatively connected to the rotatable chuck sleeve 11 for rotation thereby through the improved chuck mechanism as will hereinafter be described. Since the rock drill structure above described is well known to those skilled in the art and does not per se enter in the present invention further description is herein unnecessary.

In the illustrative embodiment of the invention shown in Figs. 1 to 10 inclusive, arranged within the forward portion of the bore 7 of the chuck housing is a cylindrical steel locking member or retaining ring 13 which has a reduced forward portion journaled in a replaceable bearing sleeve 14 herein arranged within a front opening 15 in the forward end of the chuck housing. Also rotatably mounted in the bore 7 of the chuck housing intermediate the retaining ring 13 and the chuck sleeve 11 is a steel driver member 16, the latter being interlockingly detachably coupled or clutched as by clutch teeth at 17 to the sleeve 11 and at 18 to the retaining ring 13 so that the sleeve, driver member and retaining ring rotate together. Opening through the forward end of the retaining ring is a key opening 19 through which the drill steel shank 20 and the steel lugs 21 may be inserted. Within the rearward portion of the retaining ring 13 is an enlarged circular bore 22 which cooperates with lateral recesses 23, 23 in the forward portion of the driver member 16 to provide a chamber for receiving the lugs 21 after they have been moved rearwardly through the key opening 19. An annular radially extending, rearwardly facing shoulder 24 is herein shown at the forward end of the circular bore 22. The rotatable chuck sleeve 11 has pressed or otherwise secured in its bore 25 a replaceable chuck sleeve or bushing 26, the latter having an enlarged forward cylindrical portion 27 providing a rearwardly facing shoulder 28 engaging the forward end surface of the chuck sleeve 11. This enlarged forward portion 27 of the chuck bushing projects forwardly into a bore 29 in the rear end of the driver member 16. The forward end surface of the bushing 26 is tapered at 30, and, as shown in Fig. 8, the driver member has spaced projections 31 provided with complemental surfaces engaging this tapered portion, and the inclined rear surfaces of the steel lugs 21 engage the surface of the tapered portion 30 intermediate the projections 31. The front shoulder 24 of the retaining ring is also formed with a tapered surface 32 with which the forward inclined surfaces of the steel lugs 21 may engage. The replaceable bushing 26 has a central bore 33 which receives the drill steel shank 20 for supporting the latter in a position to receive impact blows from the piston striking bar 4. At the forward end of the driver member 16 is a pair of diametrically opposite, parallel projections 34 extending forwardly into the circular bore 22 in the retaining ring 13, and these projections at their forward ends preferably abut against the rearwardly facing shoulder 24. The projections 34 provide abutment surfaces 35 for engagement by the lugs 21 of the drill steel shank when the drill steel is turned in the chamber provided by the circular bore 22 and the recesses 23, to move the lugs out of alinement with the key openings 19. Extending rearwardly from the projections 34 are internal slots or grooves 36 formed in the driver member at diametrically opposite sides of a central bore 37 which receives the steel shank. When the steel lugs are rotated into the position shown in Fig. 6 into engagement with the abutment surfaces 35 of the projections 34, they are in registry with the slots or grooves 36 and are so positioned that the steel may be moved rearwardly to bring the steel lugs within the slots or grooves. In other words, when the steel lugs have been moved against the abutment surfaces 35, they are in position to be received by the slots or grooves 36, and the drill steel can be moved rearwardly in the driver member 16 to a position for receiving the impact blows from the piston striking bar as shown in Fig. 1. The recesses 23 in the driver member and the circular bore 22 permit rotation of the steel lugs, after their insertion through the key opening 19, into engagement with the projection surfaces 35 wherein the steel is locked within the chuck mechanism. The slots or grooves 36 are of such width that substantial turning of the drill steel in either direction relative to the driver member is prevented when the steel lugs are received in them. When the lugs are received within these slots or grooves, the drill steel is locked against release from the key opening 19. The chuck bushing 26 preferably serves to center the driver member with respect to the chuck sleeve 11, and this bushing, when worn, may be easily and cheaply replaced.

The projections 34 on the driver member 16 are shown as being of such length that there is provided, between the shoulder 24 at the forward end of the circular bore 22 in the retaining ring and forwardly facing surfaces 38 on the driver member at the bases of the projections 34, a space provided by the recesses 23 between the projections that is of slightly greater length than the lugs on the drill steel shank. The drill steel lugs are moved through the key opening 19 to enter the chamber provided by the circular bore 22 and the recesses 23 and are permitted to move rearwardly, before engaging the surfaces 38, only far enough to bring them completely within the chamber so that the drill steel can be rotated to bring the lugs against the abutment surfaces 35 on the projections 34. After the lugs have been moved against the abutment surfaces 35, they are in locked relation with respect to the key opening 19 and are in position to be received by the slots or grooves 36, and the drill steel can be moved rearwardly in the bore 37 in the driver member to a position for receiving the impact blows from the piston striking bar. The chamber within which the drill steel lugs may be rotated may, of course, be varied in length, but to reduce the possibility of inadvertent release of the drill steel, it is desirable to maintain the length of the chamber to a minimum and to maintain the length of the surfaces 35 and the coplanar driving surfaces 39 at the sides of the recesses or grooves 36, at a maximum. The surfaces 39 at the sides of the slots or grooves 36 provide driving surfaces which engage and drive the steel lugs while permitting free reciprocatory movement of the steel within the chuck mechanism. The bearing sleeve 14 for the retaining ring may also be readily and cheaply replaced when worn.

In the modified embodiment shown in Figs. 11 and 12, the chuck sleeve, retaining ring, driver member and the detachable interlocking connections between the driver member, chuck sleeve and retaining ring may be generally similar to those described above. In this construction, the circular chamber in the retaining ring, shown at 22 in Fig. 1, is omitted. The driver member 16' which carries the projections 34' is elongated, i. e., of greater length than that of the preferred embodiment and preferably abuts at its forward end a rearwardly facing surface 24' on the retaining ring 13'. The chamber which receives the steel lugs, when the lugs are moved rearwardly through the key opening 19 in the retaining ring, is formed entirely within the forward portion of the driver member 16'. The steel lugs, when positioned in the chamber in the driver member, may be turned into locked relation with respect to the key opening and into engagement with abutment surfaces 35' on the projections 34'. The steel lugs, when in engagement with the abutment surfaces 35', can be moved rearwardly in the driver member 16' into the slots or grooves 36' so that the steel lugs are held against substantial rotation in either direction with respect to the driver member. The projections 34' on the driver member are of such length that there is provided, between the surface 24' on the retaining ring and the forward surfaces 38' at the bases of the projections 34', a space that is of slightly greater length than the lugs of the drill steel shank. As the drill steel lugs are moved through the key opening 19, they enter the chamber in the driver member and are permitted to move rearwardly before engaging the surfaces 38', only far enough to bring them completely within the chamber in the driver member so that the drill steel can be rotated to bring the lugs against the abutment surfaces 35' on the projections 34'. After the lugs have been moved against the abutment surfaces 35' and are in locked relation with respect to the key opening, the drill steel can be moved rearwardly in the driver member to bring the steel lugs within the slots or grooves 36' with the steel shank in position to receive the impact blows from the piston striking bar. As in the preferred embodiment above described, the driver member is detachably interlockingly coupled at 17 to the chuck sleeve 11 and at 18' to the retaining ring 13', and also the abutment surfaces 35' are coplanar with the steel driving surfaces 39. Otherwise this modified embodiment of the invention is generally similar to that above described.

As a result of this invention, it will be noted that an improved chuck mechanism is provided wherein the drill steel may be positively locked within the chuck mechanism during operation of the drill. It will further be noted that the drill steel is prevented from rotating appreciably within the chuck mechanism during operation of the drill, and, due to the relatively wide and elongated abutment surfaces on the driver member and the particular arrangement of the lug-receiving-slots or grooves, the wearing of the parts is accordingly reduced. The chuck mechanism is of rugged construction and may be easily assembled, and, by the provision of the replaceable chuck bushing, the part of the chuck mechanism on which wear is concentrated may be readily and cheaply replaced when worn. In both embodiments of the invention, there will be observed to be a driver member within which a chamber, at least in part, is provided, in which the steel lugs may be rotated into locked position, and surfaces for limiting the insertion of the lugs rearwardly, and other surfaces for limiting the turning movement of the lugs, and lug receiving slots or grooves which the lugs may enter by rectilinear movement when they engage said other limiting surfaces; and the chuck sleeve has associated with it a replaceable chuck bushing for receiving the drill steel shank. These and other advantages and the manners of use of the improved chuck mechanism will be clearly apparent to those skilled in the art.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A chuck mechanism for use with a lugged drill steel comprising, in combination, a rotatable chuck sleeve, a steel-driver member detachably coupled to said sleeve, a steel-retaining member detachably coupled to said driver member and having a front key opening, said driver member having spaced projections at its forward end and said retaining member having a circular bore located rearwardly of said key opening and within which said projections project, said driver member having recesses between said projections which cooperate with said circular bore to provide a chamber in which the steel lugs are received after insertion of the lugs rearwardly through said key opening, said lugs being rotatable in the chamber so provided and said projections providing abutment surfaces which limit rotation of the lugs in the chamber, said driver member having longitudinal grooves which receive the lugs, said lugs when in engagement with said abutment surfaces being movable rearwardly into said grooves, and said grooves holding the drill steel against substantial rotation in either direction relative to said driver member.

2. A chuck mechanism for use with a lugged drill steel, comprising, in combination, a rotatable steel-driver member having a central opening and diametrically opposite grooves communicating with said opening, said driver member having diametrically opposite forward projections providing abutment surfaces which are coplanar with the lug driving surfaces at the sides of said grooves, a steel-retaining member having a front key opening and detachably coupled to said driver member for rotation therewith, there being provided by said driver member and said retaining member rearwardly of said key opening, a chamber which receives the steel lugs when the latter have been inserted rearwardly through said key opening, the steel lugs being rotatable in the chamber into locked relation with respect to the key opening and movable when so rotated into engagement with said abutment surfaces on said projections, and said lugs being movable when in engagement with said abutment surfaces rearwardly into said grooves, and said grooves preventing substantial rotation of the drill steel in either direction relative to said driver member.

3. A chuck mechanism for use with a drill steel comprising, in combination, a rotatable chuck sleeve, a steel-driver member, a steel-retaining member, said sleeve, driver member and retaining member being detachably coupled for rotation together, and said driver member having a circular bore opening through its rearward end, and a replaceable chuck bushing pressed in the bore of said sleeve and having an enlarged forward cylindrical portion disposed forwardly of the front end of said sleeve and received in said bore in said driver member, said bushing having a central opening for receiving the drill steel shank.

4. A chuck mechanism for use with a drill steel comprising, in combination, a rotatable chuck sleeve, a steel-driver member, a steel-retaining member, said sleeve, driver member and retaining member being detachably coupled for rotation together, and said driver member having a circular bore opening through its rearward end, and a replaceable chuck bushing pressed in the bore of said sleeve and having an enlarged forward cylindrical portion disposed forwardly of the front end of said sleeve and received in said bore in said driver member, said bushing having a central opening for receiving the drill steel shank, and said bushing having a tapered front surface on said cylindrical portion and said driver member having rearward surfaces engaging said tapered surface.

5. A chuck mechanism for use with a lugged drill steel comprising, in combination, a rotatable chuck sleeve, a steel-driver member, a steel-retaining member, said sleeve, driver member and retaining member being detachably coupled for rotation together, and said driver member having a circular bore opening through its rearward end, and a replaceable chuck bushing pressed in the bore of said sleeve and having an enlarged forward cylindrical portion disposed forwardly of the front end of said sleeve and received in said bore in said driver member, said bushing having a central opening for receiving the drill steel shank, said bushing having a tapered front surface on said cylindrical portion with which inclined surfaces of the drill steel lugs are engaged, and said driver member having rearward surfaces engaging said tapered bushing surface at locations between the points of engagement of the steel lugs with said tapered surface.

6. In a chuck mechanism for use with a lugged drill steel, the combination comprising a chuck housing having a bore, a rotatable steel-driver member, a steel-retaining member, said members being detachably coupled for rotation together and rotatably received in said chuck housing bore, said retaining member having a front key opening, said driver member having forward projections provided with recesses therebetween to form a chamber located rearwardly of said key opening for receiving the steel lugs when the latter are passed rearwardly through said key opening, the steel lugs being rotatable in the chamber so provided and said forward projections providing abutment surfaces with which the steel lugs are engageable when so rotated to limit steel rotation, the steel lugs when in engagement with said abutment surfaces being located in locked position with respect to said key opening, and said driver member having diametrically opposite grooves for receiving the steel lugs when the latter are moved rearwardly from the chamber, and the sides of the grooves which engage the steel lugs being coplanar with said abutment surfaces, and said grooves preventing substantial rotation of the steel in either direction relative to said driver member.

7. In a chuck mechanism for use with a lugged drill steel, the combination comprising a rotatable steel-driver member, a steel-retaining member detachably coupled to said driver member for rotation therewith, said driver member having diametrically opposite grooves and forward projections providing abutment surfaces coplanar with side surfaces of said grooves, said retaining member having a front key opening and a circular bore located rearwardly of said key opening, said projections extending into said circular bore, said driver member having recesses intermediate said projections and said recesses cooperating with said circular bore to provide a chamber which receives the steel lugs when the latter are moved rearwardly through said key opening, the steel lugs being turnable in the chamber so provided into engagement with said abutting surfaces on said projections into a position wherein the lugs are in locked relation with respect to said key opening, and the steel lugs when in engagement with said abutment surfaces being movable rearwardly in said grooves, and said grooves preventing substantial rotation of the steel in either direction relative to said driver member.

8. In a chuck mechanism for use with a lugged drill steel, the combination comprising a chuck housing having a bore, a rotatable steel-driver member and a steel-retaining member, said members being detachably coupled together and rotatably mounted in said chuck housing bore, said driver member having diametrically opposite internal grooves and forward projections having abutment surfaces coplanar with the driving surfaces of said grooves, said retaining member having a front key opening, there being a chamber formed at least in part within the forward portion of said driver member, and the lugs of the steel upon rearward insertion thereof through said key opening moving into the chamber and turnable in the chamber into engagement with said abutment surfaces on said projections, the lugs of the steel when in engagement with said abutment surfaces being out of registry with said key opening, the steel lugs when in engagement with said abutment surfaces being movable rearwardly into said grooves, and said grooves holding the steel against substantial rotation in either direction relative to said driver member.

JOHN C. CURTIS.